(12) United States Patent
Francke

(10) Patent No.: US 6,337,482 B1
(45) Date of Patent: Jan. 8, 2002

(54) SPECTRALLY RESOLVED DETECTION OF IONIZING RADIATION

(75) Inventor: Tom Francke, Sollentuna (SE)

(73) Assignee: DigRay AB, Danderyd (SE)

(*) Notice: Subject to any disclaimer, the term of this patent is extended or adjusted under 35 U.S.C. 154(b) by 0 days.

(21) Appl. No.: 09/552,692

(22) Filed: Apr. 19, 2000

(30) Foreign Application Priority Data

Mar. 31, 2000 (SE) .............................................. 0001167

(51) Int. Cl.[7] .............................................. G01T 1/185
(52) U.S. Cl. ........................ 250/385.1; 250/374; 378/82
(58) Field of Search .................. 378/19, 82; 250/385.1, 250/374, 370.01

(56) References Cited

U.S. PATENT DOCUMENTS

| | | | | |
|---|---|---|---|---|
| 4,670,656 A | * | 6/1987 | Bolon | 250/385.1 |
| 4,686,368 A | * | 8/1987 | Anderson et al. | 250/374 |
| 5,416,376 A | * | 5/1995 | Wuest et al. | 313/93 |
| 6,011,265 A | * | 1/2000 | Sauli | 250/374 |

FOREIGN PATENT DOCUMENTS

WO  WO 9923859  5/1999

* cited by examiner

Primary Examiner—David V. Bruce

(57) ABSTRACT

Spectrally resolved detection of ionizing radiation in a detector comprising a chamber (13) filled with an ionizable substance, a radiation entrance (33), an electron avalanche amplification means, and a read-out arrangement (29), comprises introducing a broadband radiation beam (1) into the chamber between and in parallel first and second electrode arrangements for ionization of the ionizable substance and avalanche amplifying said electrons. By means of the read-out arrangement (29) electron avalanches ($S_{X1}$, $S_{X2}$, ... $S_{XN}$), derivable mainly from ionization in sections ($X_1$, $H_2$, ..., $X_N$) of the chamber that are separated in the direction of the introduced radiation beam, are separately detected. From spectrally resolved absorption data, weighting factors ($W_{11}$, $W_{21}$, ..., $W_{M1}$, $W_{12}$, $W_{22}$, ..., $W_{M2}$, ..., $W_{1N}$, $W_{2N}$, ..., $W_{MN}$) for different spectral components ($E_1$, $E_2$, ..., $E_M$) of the radiation (1) and for different sections ($X_1$, $X_2$, ..., $X_N$) of the chamber are deduced, each of said weighting factors being substantially proportional to the photon flux ($\phi_{11}$, $\phi_{21}$, ..., $\phi_{M1}$, $\phi_{12}$, $\phi_{22}$, ..., $\phi_{M2}$, ..., $\phi_{1N}$, $\phi_{2N}$, ..., $\phi_{MN}$) of the respective spectral component ($E_1$, $E_2$, ..., $E_M$) in the respective section ($X_1$, $X_2$, ..., $X_N$). Finally, by means of said detected electron avalanches ($S_{X1}$, $S_{X2}$, ..., $S_{XN}$) and said weighting factors, the respective detected electron avalanches ($S_{E1}$, $S_{E2}$, ..., $S_{EM}$) that are derivable from ionization by the respective spectral component of said broadband radiation are deduced.

47 Claims, 6 Drawing Sheets

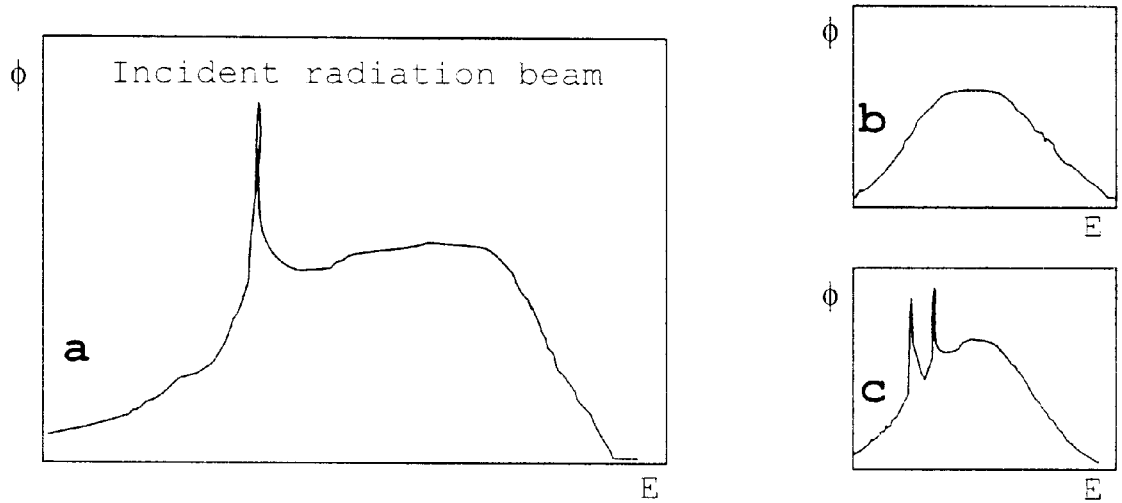
Fig. 5a-c
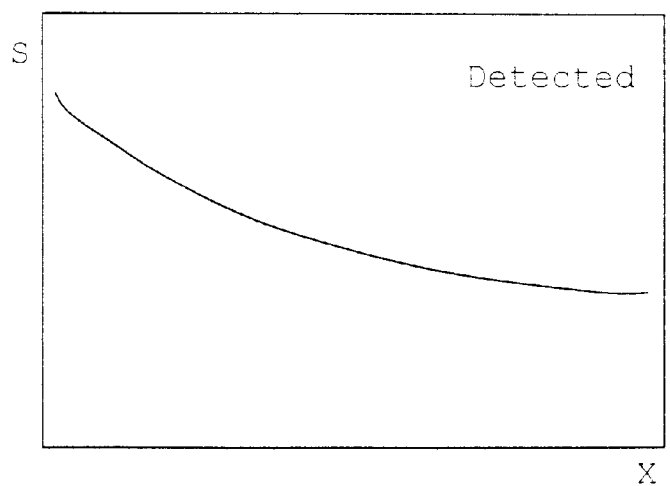
Fig. 6

SPECTRALLY RESOLVED DETECTION OF IONIZING RADIATION

TECHNICAL FIELD OF THE INVENTION

The present invention generally relates to the detection of ionizing radiation, and particularly to the detection of X-rays.

More specifically, the invention relates to a method for spectrally resolved detection of ionizing radiation, and to a detector for spectrally resolved detection of ionizing radiation.

DESCRIPTION OF RELATED ART AND BACKGROUND OF THE INVENTION

Gaseous detectors, in general, are very attractive at photon energies lower than approximately 10 keV. The main advantages of gaseous detectors are that they are cheap to manufacture compared to solid state detectors, and that they can employ gas multiplication to strongly (on orders of magnitude) amplify the signal amplitudes. However, at energies exceeding 10 keV the gaseous detectors are less attractive as the stopping power of the gas decreases rapidly with increased photon energy. This results in a heavily deteriorated spatial resolution due to extended tracks of so-called long-range electrons, which are created as a result of the X-ray absorption.

An improved spatial resolution is achieved by a gaseous detector for use in planar beam radiography, in which electrons released by interactions between photons and gas atoms can be extracted in a direction essentially perpendicular to the incident radiation. A detector of such a kind is described in our copending international application No. PCT/SE98/01873 entitled A method and a device for planar beam radiography and a radiation detector and filed on Oct. 19, 1998.

It is of interest to the measure the energy of X-ray photons. However, what is normally measured with energy sensitive X-ray detectors is the energy released when the X-ray interacts with the detector material. In this interaction one or more primary electrons are emitted from the atom with which the X-ray interacts. Each of these electrons carries a kinetic energy, which energy can be transferred to the material through further interactions between the electron and the atoms of the material e.g. in the form of charges (electrons in an insulator, and electron-hole pairs in a semiconductor) or light in a scintillating material.

The released charge, or produced light, is detected with an instrument and the peak of the resulted signal, or the integrated signal, is a measure of the kinetic energy of the primary electron(s) emitted. This signal is also used as a measure of the energy of the incoming X-ray photon.

However, the kinetic energy of the primary electron(s) produced is not directly proportional to the X-ray energy as the X-ray can interact with the absorbing material in a number of different ways.

If the X-ray photon interacts with the material through photoelectric effect the kinetic energy of the released primary electron is the energy of the X-ray minus the binding energy of the electron, which in turn depends on which orbital the electron originated from (i.e. the K-, L-, M-shell etc.). Often, the converter material also consists of several different elements with different binding energies.

Furthermore, the photoelectron can or cannot be accompanied by one or more Auger electrons being emitted when the hole in the atom is filled by an electron from an outer orbit. This Auger electron can have a number of different energies depending on the primary electron that was emitted and on the electron that takes its place.

The X-ray photon can also interact with the absorbing material through Compton scattering where an electron is emitted together with a new X-ray of lower energy than the first. The new X-ray can be detected in the detector or it can escape, thus giving different deposited energies. The Compton electron emitted can have any energy between null and nearly the total X-ray energy.

There are several more, but less probable, ways the X-ray can interact with the absorbing material. These effects result in an ambiguity in the correlation between the amplitude of the signal and the energy of the incoming radiation, which reduce the energy resolution.

SUMMARY OF THE INVENTION

Accordingly, it is an object of the present invention to provide a method for spectrally resolved detection of ionizing radiation that overcome some of the problems described above, and which can operate in a broad energy range of incoming radiation and which provides for an improved energy resolution.

It is in this respect a particular object of the invention to provide such a method that also provides for a high spatial resolution.

A further object of the present invention is to provide a method for spectrally resolved detection of ionizing radiation, which is effective, fast, accurate, reliable, easy to perform, and which can be implemented in a simple and cost effective way.

Still a further object of the invention is to provide a method for spectrally resolved detection of ionizing radiation, which is sensitive and can thus operate at very low radiation fluxes.

Yet a further object of the invention is to provide a detector for spectrally resolved detection of ionizing radiation, which can be given a length, in the direction of the incoming radiation, for achieving a desired stopping power, which makes it possible to detect a major portion of the incoming radiation.

Still a further object of the invention is to provide a method for spectrally resolved detection of ionizing radiation, in which electrons released by interactions between photons and gas atoms can be extracted in a direction essentially perpendicular to the incident radiation. Hereby it is possible to obtain particularly high spectral and spatial resolutions.

Yet a further object of the invention is to provide a method for spectrally resolved detection of any kind of ionizing radiation, including electromagnetic radiation as well as incident particles, including elementary particles.

It is also an object of the present invention to provide a device for spectrally resolved detection of ionizing radiation, which can operate in a broad energy range of incoming radiation and which provides for an improved energy resolution.

It is in this respect a particular object of the invention to provide such a device that also provides for a high spatial resolution.

A further object of the present invention is to provide a device for spectrally resolved detection of ionizing radiation, which is effective, fast, accurate, reliable, easy to install and use, and of low cost.

Still a further object of the invention is to provide a device for detection of ionizing radiation, which is sensitive and can thus operate at very low radiation fluxes.

Yet a further object of the invention is to provide a device for spectrally resolved detection of ionizing radiation, in which electrons released by interactions between photons and gas atoms can be extracted in a direction essentially perpendicular to the incident radiation. Hereby it is possible to obtain particularly high spectral and spatial resolutions.

Still a further object of the invention is to provide a device for spectrally resolved detection of any kind of ionizing radiation, including electromagnetic radiation as well as incident particles, including elementary particles.

These and other objects are, according to the present invention, attained by methods and devices as claimed in the appended claims.

The invention described is a technique for detecting the energy of the X-ray with fewer uncertainties than those described above, by measuring the depth at which the X-ray interacted in the absorbing material. With this technique it is not possible to determine the energy of a single X-ray, but the energy spectrum of an incoming X-ray flux can be determined with good accuracy.

Further characteristics of the invention and advantages thereof will be evident from the following detailed description of preferred embodiments of the invention, which are shown in the accompanying drawings.

BRIEF DESCRIPTION OF THE DRAWINGS

The present invention will become more fully understood from the detailed description of embodiments of the present invention given hereinbelow and the accompanying FIGS. 1–12, which are given by way of illustration only, and thus are not limitative of the invention.

FIGS. 5a–c illustrate schematically different broadband radiation spectra that are detectable by employing the present invention.

FIG. 6 is a schematic diagram of detected signal S as a function of penetration depth X into a drift volume of the device shown in FIGS. 1–3.

DETAILED DESCRIPTION OF PREFERRED EMBODIMENTS

In the following description, for purposes of explanation and not limitation, specific details are set fourth, such as particular techniques and applications in order to provide a thorough understanding of the present invention. However, it will be apparent to one skilled in the art that the present invention may be practiced in other embodiments that depart from these specific details. In other instances, detailed descriptions of well-known methods and apparatuses are omitted so as not to obscure the description of the present invention with unnecessary details.

Figure 1:
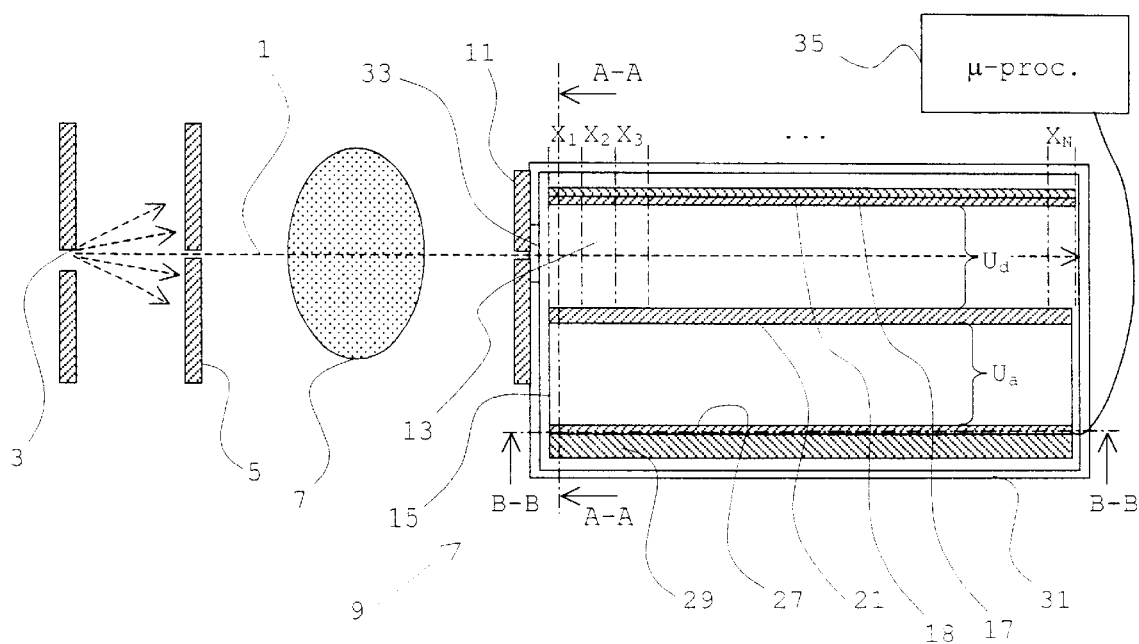
FIG. 1 illustrates schematically a device for planar beam radiography according to an embodiment of the invention.

FIG. 1 is a schematic sectional view in a plane orthogonal to the plane of a planar X-ray beam 1 of a device for planar beam radiography, according to an embodiment of the present invention.

The device includes an X-ray source 3, which together with a thin collimator window 5, produce the planar fan-shaped X-ray beam 1, for irradiation of an object 7 to be imaged. The collimator window 5 can be replaced by other means for forming an essentially planar X-ray beam, such as an X-ray diffraction mirror or an X-ray lens etc.

The beam transmitted through the object 7 enters a detector 9. Optionally, a thin slit or collimator window 11, which is aligned with the X-ray beam and forms the entrance for the X-ray beam 1 to the detector 9, is provided. A major fraction of the incident X-ray photons are detected in detector 9, which includes a chamber 13, electrode arrangements 17, 18; 21; and 27, 29, respectively. The detector 9 is oriented such that the X-ray beam enters sideways between a first 17, 18 and a second 21 electrode arrangement between which a voltage $U_d$ is applicable. The electrode arrangements are preferably mutually substantially parallel and separated by a short distance.

Chamber 13 constitutes a conversion and drift volume and is filled with an ionizable substance, which may be a gas, a liquid or a solid. Chamber 13 may be divided into sections, $X_1, X_2, \ldots, X_N$, N being a positive integer, which sections are separated in the direction of the incident X-ray beam. The radiation entered into chamber 13 ionizes the substance and the electrical field created by voltage $U_d$ results in a drift field in region 13 causing drift to electrons towards electrode 21, and towards an avalanche amplification region or means 15, and drift of ions towards electrode 17, 18. Chamber 13 is preferably filled with a gas, which can be a mixture of for example 90% krypton and 10% carbon dioxide or a mixture of for example 80% xenon and 20% carbon dioxide. The gas can be under pressure, preferably in a range 1–20 atm. In such instance, the detector includes a gas tight housing 31 with a slit entrance window 33, through which the X-ray beam 1 enters the detector. The window is made of a radiation permeable material.

Detector 9 is arranged such that the released electrons will drift towards and enter an electron avalanche amplification region, preferably through electrode arrangement 21, and wherein they will be multiplied by means of a voltage $U_a$, which may be applied between electrode arrangement 21 and electrode arrangement 27, 29. Voltage $U_a$ is chosen such that electrons from chamber 13 passing electrode 21 is accelerated towards arrangement 27, 29 resulting in electron multiplication and thus multiple avalanche electrons reaching arrangement 27, 29, which also constitutes a read-out arrangement of detector 9 for the detection of pulses induced by the electron avalanches. Alternatively, the read-out arrangement can be formed separated from electrode arrangement 27, 29 (not shown in FIG. 1).

The read-out arrangement 27, 29 is further connected to a signal processing means 35, which may be a microcomputer provided with appropriate software, for further processing of the detected pulses. The processing will be described in detail further below in this description.

The pulses derivable from ionization by different X-ray photons are individually detectable, and hence single-photon detection is realized. Further, the height of a pulse, of the integrated value of a pulse, is to some extent proportional to the incident photon energy. Hence, the device may comprise processing means arranged for discriminating such a pulse in dependence on a pulse derived parameter, preferably pulse height or integrated pulse value.

The X-ray source 3, the collimator window 5, the optional collimator window 11 and the detector 9 may be connected and fixed in relation to each other by a suitable means for example a support (not shown in FIG. 1).

As the X-rays enter the detector in a direction parallel to the electrodes the detector can easily be made with an interaction path long enough to allow a major fraction of the incident X-ray photons to interact and be detected.

Figure 2:
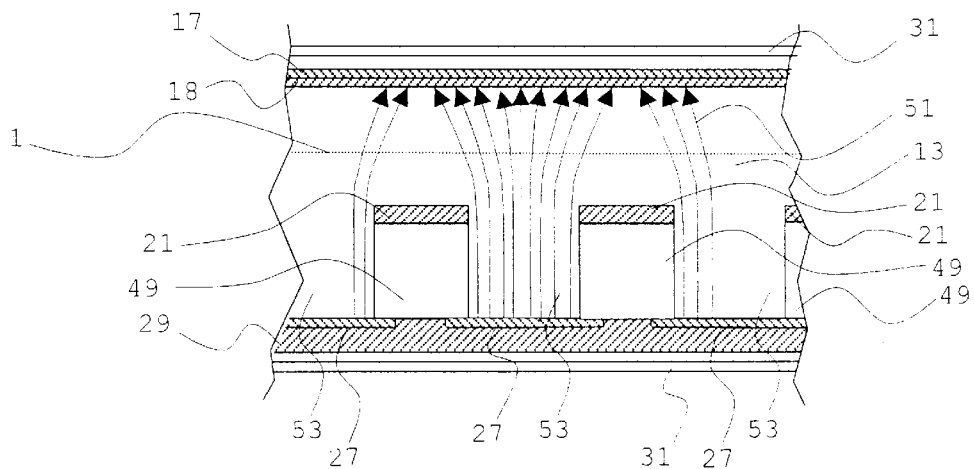
FIG. 2 is a schematic, partly enlarged, cross sectional view, along A—A of FIG. 1.

Referring next to FIG. 2, which shows a schematic, partly enlarged, cross sectional view, taken along A—A of FIG. 1, the detector 9, will be further described. It shall, however, be appreciated that the present invention is not limited to this design. For instance, other possible avalanche amplification means and read-out arrangement designs are further elaborated in our co-pending Swedish patent application No. 9901325-2 entitled Radiation detector, an apparatus for use in planar radiography and a method for detecting ionizing radiation and filed on Apr. 14, 1999, which application hereby is incorporated by reference.

It shall also be appreciated that the avalanche amplification means may be a solid-state device or comprise a liquid amplification region.

The first electrode arrangement 17, 18 comprises a dielectric substrate 17 and a conductive layer 18 being a cathode electrode, the second electrode arrangement 21 is also referred to as avalanche cathode, and the third electrode arrangement 27, 29 comprises a dielectric substrate 29 and conductive layer strips of pads 27, being avalanche anode and read-out elements.

A dielectric 49 may be arranged between avalanche cathode 21 and avalanche anode 27. This could be a gas or a solid substrate 49 carrying cathode 21 and anode 27, as shown in FIG. 2. The voltage $U_a$, which is applicable between cathode 21 and anode 27, produces an electric field 51 in a plurality of preferably gas-filled avalanche amplification regions 53. The avalanche regions 53 are formed in a region between and around the edges of the avalanche cathode 21 which are facing each other, and to less extent between the avalanche cathode 21 and the avalanche anode 27, where a concentrated electric field will occur due to the applied voltages.

The voltages applied are selected, such that a weaker electric field, drift field, is created over chamber 13, and a stronger field in regions 53. Electrons (primary and secondary electrons) released by interaction in chamber 13 will drift, due to the drift field, towards the avalanche amplification means 15. They will enter the very strong avalanche amplification field and be accelerated. The accelerated electrons will interact with other materia (e.g. atoms, molecules etc.) in one of regions 53, causing further electron-ion pairs to be produced. Those produced electrons will also be accelerated in the field, and will interact repetitively with new materia, causing further electron-ion pairs to be produced. This process continues during the travel of the electrons in the avalanche region towards the avalanche anode 27 located at the bottom of the avalanche region, and thus an electron avalanche is formed.

The avalanche regions 53 are formed by openings or channels in cathode 21 and in the dielectric substrate 49, if present. The openings or channels can be of arbitrary shape, e.g. circular or square, as seen from above, or continuous, longitudinal extending between two edges of the cathode 21. In the case the openings or channels are circular or square when seen from above they are arranged in rows, each row of openings or channels including a plurality of openings or channels. A plurality of longitudinal openings or channels or rows of channels are formed beside each other, parallel with each other or with the incident X-rays. Alternatively, the openings or channels can be arranged in other patterns.

Conductive layer elements 27, which also form read-out elements, are arranged in connection with the openings or channels forming the avalanche regions 53. Preferably at least one element 27 is provided for each opening or channel. The elements 27 are electrically insulated from each other, and separately connected to the processing means (not shown in FIG. 2).

By providing a plurality of read-out elements 27 as shown in FIG. 2 a detector 9 is achieved, wherein electron avalanches derivable mainly from ionization by transversely separated portions of the planar radiation beam 1 are separately detectable. Hereby, detector 9 provides for one-dimensional imaging, see further discussion below.

In the embodiment described particular locations and geometries of anode, cathode, and read-out arrangements are described. There are, however, a plurality of other locations and geometries that are equally well suitable in connection with the present invention.

Figure 3:
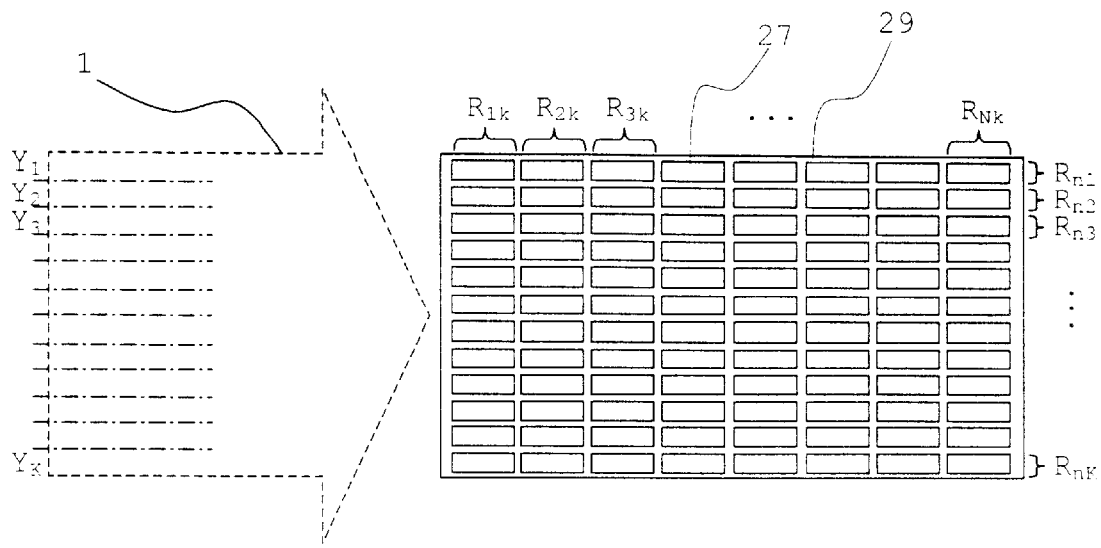
FIG. 3 is a schematic cross sectional view along B—B of FIG. 1, wherein an incident planar X-ray beam is indicated.

Referring now to FIG. 3, which shows a schematic cross sectional view taken along B—B of FIG. 1, a preferred configuration of avalanche anode and read-out arrangement 27, 29 will be depicted. In FIG. 3 also planar X-ray beam 1 is indicated, said beam being divided into transversely separated portions $Y_1, Y_2, \ldots, Y_K$, where K is a positive integer.

The arrangement is formed by NxK conductive pads 27 on dielectric substrate 29 electrically insulated from each other, and wherein each conductive pad is individually connected to processing means 35, such that pulses induced in respective pad is individually detectable. The pads 27, being located in a matrix, are indicated by $R_{1k}, R_{2k}, \ldots, R_{Nk}$, in the direction of incident beam 1 (k=1, 2, . . . , K) and by $R_{n1}, R_{n2}, \ldots, R_{nk}$, in a direction perpendicular thereto (N=1, 2, . . . , N). Preferably the pads 27 are located beneath the openings or channels or rows of openings or channels as shown in FIG. 2, Pads 27 may be formed by photolithographic methods or electroforming, etc.

Pads 27 extend in directions parallel to the direction of incident X-ray photons at each location, which provides for an improved spatial resolution, i.e. compensation for parallax errors in detected images. Thus, as X-ray beam 1, in practice, is a divergent bunch of rays, the pads 27 are preferably not located parallel to each other (as in FIG. 3), but in directions pointing to a common point (i.e. fan-shaped) coinciding with the source of the X-rays (if the source is a point source).

The width of the pads 27, and of the space between them, are chosen for the particular detector in order to obtain desired (optimal) spatial resolution. Typical values are 0.01–1 mm wide pads and with 0.01–1 mm space between them. The number of pads K in the direction perpendicular to the direction of incident beam 1 is chosen in order to detect a desired (optimal) width of planar beam 1. Typical values are 20 cm for mammography and 40 cm for general X-ray radiology (e.g. chest X-ray). However, the width can be significantly less, in some instances down to a single very narrow strip.

The length of the pads is adjusted to obtain desired (optimal) spectral resolution, which will be described further below, and the number of pads N in the direction of incident beam 1 is chosen in order to detect a desired (optimal) bandwidth of the broadband beam 1. Preferably, the length of the pads 27 and the lengths of the chamber sections $X_1, \ldots, X_N$ are the same and hence pad $R_{nk}$ is located in a straight line beneath chamber section $X_n$, where n=1, 2, . . . , N. Typical values of the length are 1–20 cm.

It is general for the invention that each incident X-ray photon causes one induced pulse in one (or more) detector electrode element. The pulses are processed in the processing electronics, which eventually shapes the pulses, and integrates or counts the pulses from each pad.

It is also general for the invention that the inter-electrode volumes are very thin, which results in a fast removal of ions, which leads to low or no accumulation of space charges. This makes operation at high rate possible. The small distances lead also to low operating voltages, which results in low energy in possible sparks, which is favorable for the electronics. The focusing of the field lines in the avalanche means is also favorable for suppressing streamer formations. This leads to a reduced risk for sparks.

Further, there will in such instance be possible to geometrically discriminate unwanted radiation and electrons, such as fluorescent X-rays and long range electrons, which otherwise would lead to deteriorated spatial resolution and sensitivity. Such detection is further elaborated in our co-pending Swedish patent applications No. 9901326-0 entitled A method for detecting ionizing radiation, a radiation detector and an apparatus for use in planar beam radiography and filed on Apr. 14, 1999 and No. 0000957-1 entitled Detector and method for detection of ionizing radiating and filed on Mar. 21, 2000. These applications are hereby incorporated by reference.

As an alternative for all embodiments, the electric field in the conversion and drift gap (volume) can be kept high enough to cause electron avalanche amplification, hence to be used in a pre-amplification mode.

As a further alternative, the electrode arrangement 21 may be dispensed with, and an electric field between layer 18 and elements 27 can be kept high enough to cause electron avalanche amplification within the complete volume as defined by regions 13 and 53.

Further, all electrode surfaces may be covered by a high-resistive or semiconducting material in order to decrease the energy in possible sparks, which will influence the measurement and may destroy electronic equipment of the detector. Such resistive layers are further described in our copending Swedish patent application No. 9901327-8 entitled Radiation detector and an apparatus for use in radiography and filed on Apr. 14, 1999. The application is hereby incorporated by reference.

Figure 4:
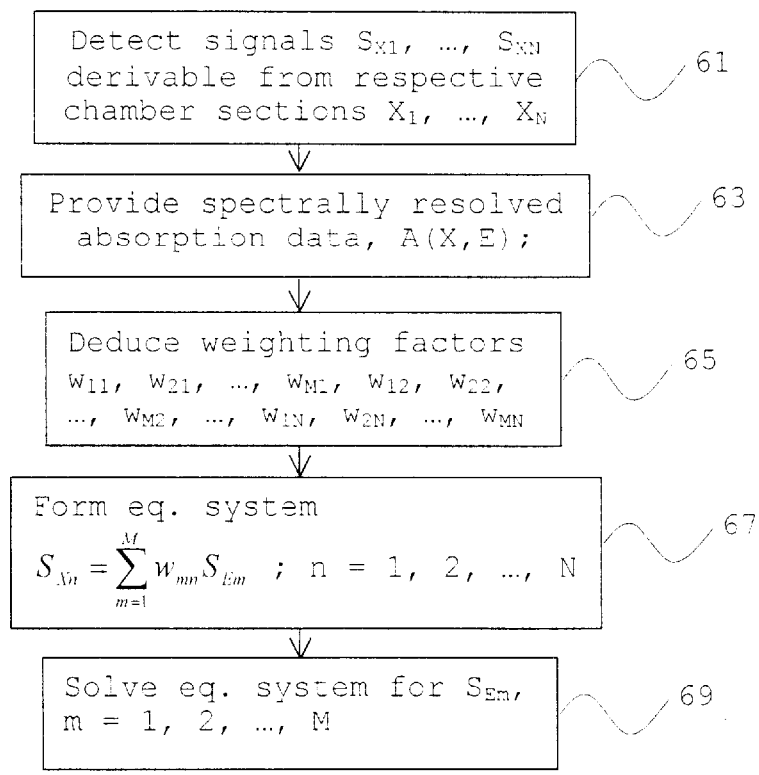
FIG. 4 is a schematic block diagram of a first embodiment of the method for spectrally resolved detection of ionizing radiation.

Turning now to FIG. 4, which is a schematic block diagram of a process for spectrally resolved detection of ionizing radiation, a first simple embodiment of the inventive method will be depicted. This method may be implemented in processing means 35 of the device of FIGS. 1–3, even though a simpler device may be employed.

By means of read-out arrangement 27, 29 electron avalanches, and/or correspondingly produced ions, derivable mainly from ionization in sections $X_1, X_2, \ldots, X_N$ of chamber 13 that are separated in the direction of the introduced radiation beam, are, in a step 61, separately detected. The pads 27 in each line perpendicular to beam 1 may here be grouped together so as to form a one-dimensional array of pads $R_1, R_2, \ldots, R_N$, or alternatively, only one pad in each such line is used for the detection. In the latter case no planar radiation beam is needed. The number of pulses induced during a predetermined period of time and derivable from ionization in the respective chamber section $X_1, X_2, \ldots, X_N$ is denoted $S_{X1}, S_{X2}, \ldots S_{XN}$.

Alternatively, the signals $S_{X1}, S_{X2}, \ldots S_{XN}$ are due to the integrated signal derivable from ionization in the respective chamber section $X_1, X_2, \ldots, X_N$. The integrated signal may result from the overall integrated value of the pulses or from integrated amplitude values.

Then, in a step 63, spectrally resolved absorption data for absorption of said broadband radiation in said ionizable gas is provided. Said absorption data comprises the absorption probability in respective chamber section $X_1, X_2, \ldots, X_N$ for each respective spectral component $E_1, E_2, \ldots, E_N$. The absorption probability is determined from the combined cross sections for photoelectric effect and Compton scattering, respectively, of an X-ray photon with the ionizing substance used, taken into account the depth in the direction of the incoming radiation of the respective chamber section $X_1, X_2, \ldots, X_N$.

Next, in a step 65, weighting factors $W_{11}, W_{21}, \ldots, W_{M1}$, $W_{12} W_{22}, \ldots, W_{M2}, \ldots, W_{1N}, W_{2N}, \ldots, W_{MN}$ for different spectral components $E_1, E_2, \ldots, E_M$ of said broadband radiation 1 and for different of said separated sections $X_1, X_2, \ldots, X_N$ of the chamber are deduced from the absorption data. Each of the weighting factors is substantially proportional to the photon flux $\phi_{11}, \phi_{21}, \ldots, \phi_{M1}, \phi_{12}, \phi_{22}, \ldots, \phi_{M2}, \ldots, \phi_{1N}, \phi_{2N}, \ldots, \phi_{MN}$ of the respective spectral component $E_1, E_2, \ldots, E_M$ in the respective section $X_1$, bx;1$X_2, \ldots, X_N$. The weighting factors take into account all kinds of attenuation or scattering, including e.g. photoelectric effect and Compton scattering.

Finally, in steps 67 and 69, by means of the detected signals $S_{X1}, S_{X2}, \ldots, S_{XN}$, derivable mainly from ionization in different sections of the chamber, and the weighting factors, the respective signals $S_{E1}, S_{E2}, \ldots S_{EM}$ that are derivable from ionization by the respective spectral component of said broadband radiation are deduced.

This deduction is achieved by, in step 67, forming an equation system:

$$S_{Xn} = \sum_{m=1}^{M} w_{mn} S_{Em}, n = 1, 2, \ldots, N,$$

and in step 69, solving the equation system for the respective signals $S_{E1}, S_{E2}, \ldots S_{EM}$.

In such a manner the detection and processing result in a spectrally resolved signal having components $S_{E1}$, bx;1$S_{E2}$, . . . , $S_{EM}$.

The number M of spectral components of the detected signal is equal to, or less than, the number N of sections of the chamber, i.e. the number of detection points in the direction of beam 1.

The number M of spectral components of the detected signal is chosen for the particular application and in dependence on the nature of the broadband radiation 1 that is used. Hence, in FIGS. 5a–c, three different broadband radiation spectra that are detectable by employing the present invention are schematically illustrated.

In FIG. 5a is shown a spectrum of a radiation beam incident on detector 9 including a broad Bremsstrahlung, i.e. a continuous, emission spectrum, and a narrow emission line. Similarly, FIG. 5b shows a radiation spectrum of an incident radiation beam in lack of narrow emission lines, thus only including the broad Bremsstrahlung emission. FIG. 5c is similar to FIG. 5a, but here the incident radiation beam spectrum includes two narrow emission lines separated only by a small energy. These spectra are typical output spectra from ordinary X-ray tubes.

The number M of spectral components of the detected signal is thus chosen in dependence on the spectrum of the broadband section such that spectral details of the spectrum, particularly narrow resonance peaks or double peaks as being illustrated in FIGS. 5a–c, are resolved.

In a preferred version of the invention, the number M of spectral components of said detected signal is at least three, in a second preferred version the number M is at least five, in a third preferred version the number M is at least seven, and finally, in a fourth preferred version the number M is at least nine.

Note that the lengths of sections $X_1, X_2, \ldots, X_N$ of the chamber may be different, e.g. increase in the direction of radiation beam 1. Similarly, the spectral widths of the spectral components $E_1, E_2, \ldots, E_M$ of the broadband radiation may be different, e.g. increase for increasing energy.

Turning now to FIG. 6 a typical exemplary diagram of detected signal S as a function of penetration depth X into drift chamber 13 of the device shown in FIGS. 1–3 is shown. This signal is the one measured in step 61 of FIG. 4. It shall be noted that N in the illustrated case is large such that the signal looks like a continuous signal. It shall, however, be appreciated that the diagram comprises a single signal value for each of a finite number N of penetration depth ranges (i.e. chamber sections).

Figure 7:
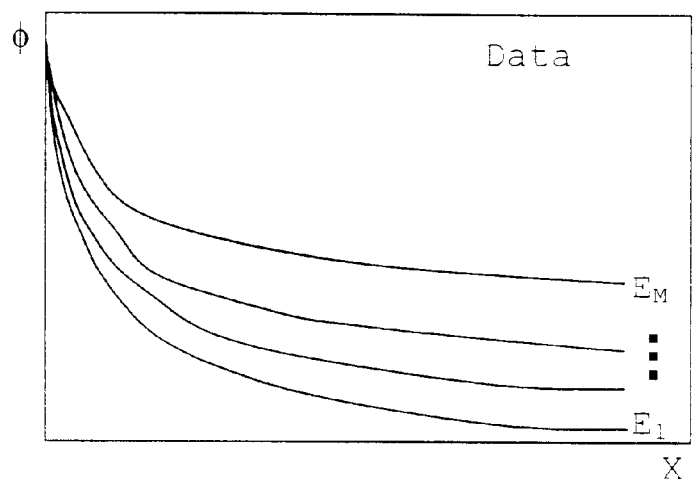
FIG. 7 is a schematic diagram showing the flux of X-ray photons as a function of penetration depth X into an ionizable gas used in the drift chamber of the device shown in FIGS. 1–3 for different photon energies $E_1, \ldots, E_M$.

FIG. 7 is a diagram showing typical exemplary flux of X-ray photons as a function of penetration depth X into an ionizable gas as used in drift chamber 13 of the device shown in FIGS. 1–3 for different photon energies $E_1$, bx;1$E_2, \ldots, E_M$ as obtained from e.g. literature data or measurements performed. Such a diagram is used for deducing of the weighting factors as performed in step 65 of FIG. 4.

Figure 8:
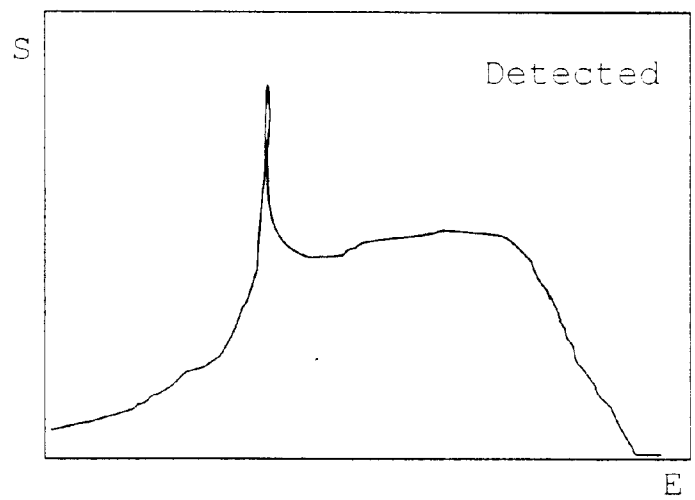
FIG. 8 is a schematic diagram of signal S as a function of photon energy E as detected by employing the first embodiment of the method for spectrally resolved detection of ionizing radiation.

FIG. 8 is finally an exemplary diagram of signal S (i.e. $S_{E1}, S_{E2}, \ldots, S_{EM}$) as a function of photon energy E (i.e. $E_1, E_2, \ldots, E_M$) as detected by employing the first embodiment of the method for spectrally resolved detection of ionizing radiation (i.e. the radiation spectrum as illustrated in FIG. 5a) as schematically shown in FIG. 4, when no object is placed between the X-ray source and the detector.

Figure 9:
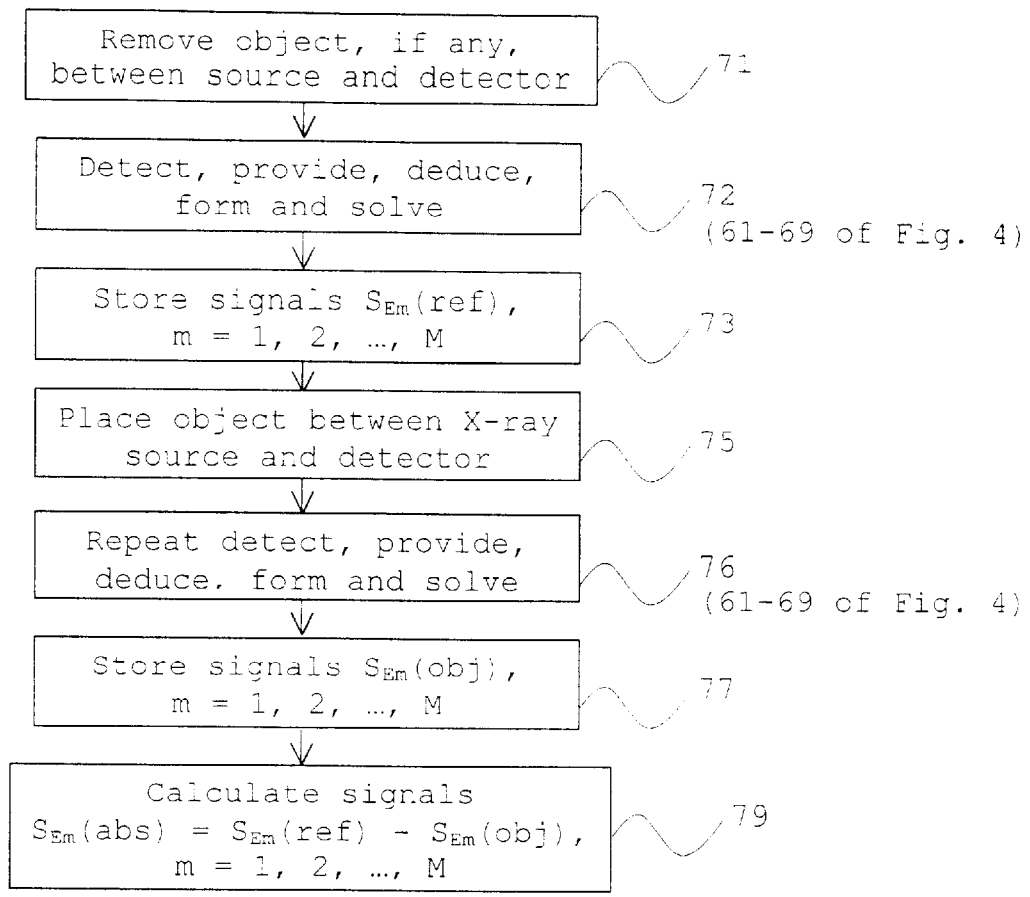
FIG. 9 is a schematic block diagram of a second embodiment of the method for spectrally resolved detection of ionizing radiation.

With reference next to FIG. 9, which is a schematic block diagram of a process for spectrally resolved detection of ionizing radiation, a second embodiment of the inventive method will be depicted.

In a step 71, all objects, if any, between the source and the detector are removed such that detector 9 will be able to record a reference spectrum. This is achieved through the step 72, including the steps of detecting, providing, deducing, forming and solving as discussed with reference to FIG. 4 and indicated therein by numerals 61–69. This reference spectrum is then, in a step 73, stored as $S_{Em}(ref)$, m=1, 2,, ..., M, see FIG. 8 for an example of such a detected spectrum.

Next, in a step 75, the object 7 to be measured is placed between the X-ray source 3 and the detector 9, whereafter, in a step 76, a spectrum of radiation transmitted through object 7 is recorded, by the repeating of steps 61–69 of FIG. 4. This spectrum is then, in a step 77, stored as $S_{Em}(obj)$, m=1, 2, ..., M.

Finally, in a step 79, an absorption spectrum for the spectrally resolved absorption of X-ray radiation by object 7 is calculated as signals:

$$S_{Em}(abs)=S_{Em}(ref)-S_{Em}(obj), \text{ for } m=1, 2, \ldots, M.$$

In an alternative embodiment the reference or calibration spectrum is not measured by detector 9, but provided in other manner, e.g. as measured by other device or provided from literature data.

Figure 10:
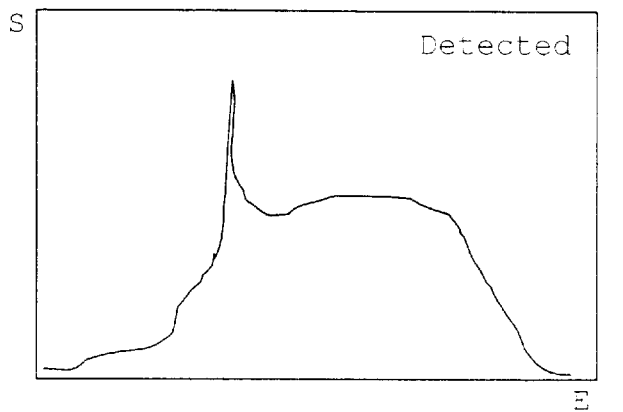
FIG. 10 is a schematic diagram of detected signal S as a function of photon energy E when an object, e.g. a human body part, is placed between an X-ray source and a detector in accordance with the present invention.

FIG. 10 is an exemplary diagram of detected signal S(obj) (i.e. $S_{E1}(obj), S_{E2}(obj), \ldots, S_{EM}(obj)$) as a function of photon energy E (i.e. $E_1, E_2, \ldots, E_M$) when an object, e.g. a human body part, is placed between an X-ray source and a detector in accordance with the present invention.

Figure 11:
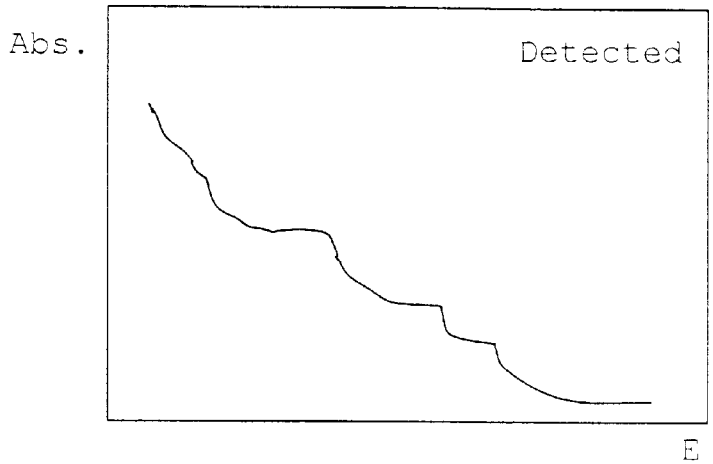
FIG. 11 is a schematic diagram of absorption A in an object as a function of photon energy E as detected by employing the second embodiment of the method for spectrally resolved detection of ionizing radiation.

FIG. 11 is an exemplary diagram of absorption A (i.e. $A_1, A_2, \ldots, A_M$) in the object as a function of photon energy E (i.e. $E_1, E_2, \ldots, E_M$) as detected by employing the second embodiment of the method for spectrally resolved detection of ionizing radiation.

Figure 12:
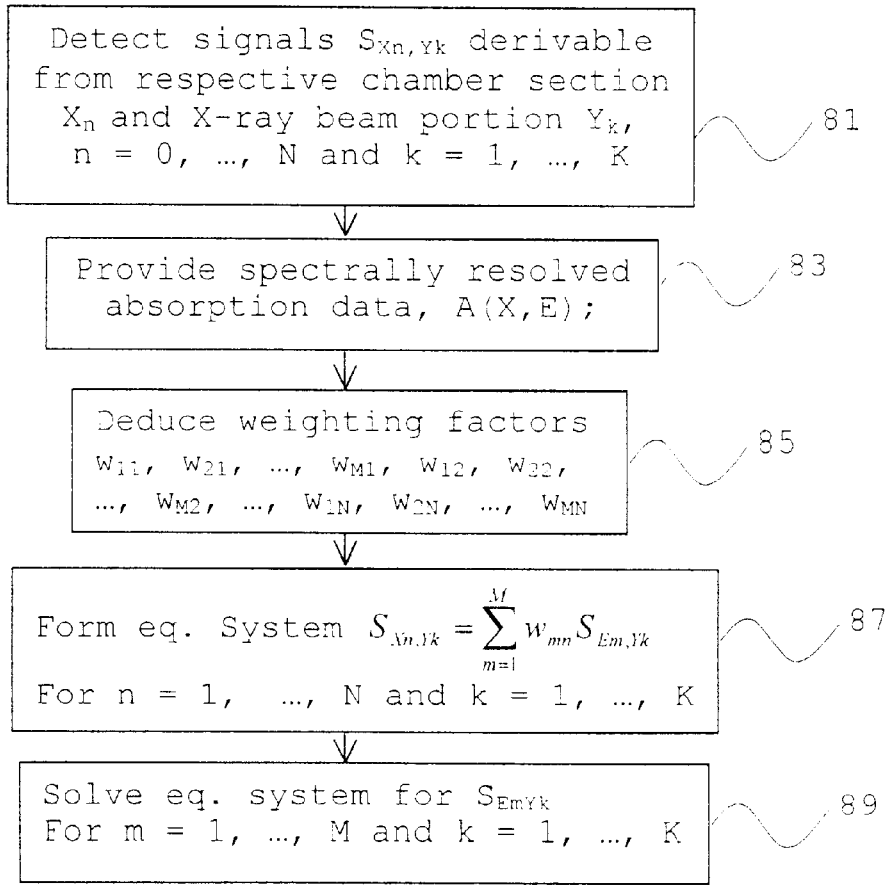
FIG. 12 is a schematic block diagram of a third embodiment of the method for spectrally resolved detection of ionizing radiation.

With reference next to FIG. 12, which is a schematic block diagram of a process for spectrally resolved detection of ionizing radiation, a third embodiment of the inventive method will be depicted.

The current method uses detector 9 as described with reference to FIGS. 1–3, and planar radiation beam 3 with transversely separated portions $Y_1, Y_2, \ldots, Y_K$ as indicated in FIG. 3 for, in a step 81, separately detecting signals (i.e. for instance number of detected pulses) $S_{Xn,Yk}$, n=1, 2,, ... , N and k=1, 2, ..., K, that are derivable mainly from ionization by respective transversely separated portion $Y_k$ in respective section $X_n$.

Next, in a step 83, spectrally resolved absorption data for absorption of said broadband radiation in said ionizable gas is provided, similar to step 63 of FIG. 4. This absorption data is used, in a step 85, to deduce weighting factors $W_{11}$, bx;1$W_{21}, \ldots, W_{M1}, W_{12}, W_{22}, \ldots, W_{M2}, \ldots, W_{1N}, W_{2N}, \ldots, W_{MN}$ for different spectral components $E_1$, bx;1$E_2, \ldots, E_M$ of broadband radiation 1 and for different of separated sections $X_1, X_2, \ldots, X_N$ of the chamber, this step being essentially identical to step 65 of FIG. 4. Each weighting factor $W_{mn}$, m=1, ..., M and n=1, ..., N, is as before substantially proportional to the respective photon flux $\phi_{mn}$ of the respective spectral component $E_m$ in the respective section $X_n$.

Thereafter, in steps 87 and 89, by means of detected signals $S_{Xn,Yk}$, n=1, 2, ..., N and k=1, 2, ..., K, and the above depicted weighting factors the respective signals $S_{Em,Yk}$, m=1, 2, ..., M and k=1, 2, ..., K, which are derivable mainly from ionization by the respective spectral component of the respective transversely separated portions of said broadband radiation, are deduced.

The deducing is achieved by, in step 87, forming an equation system:

$$S_{X_n,Y_k} = \sum_{m=1}^{M} w_{mn} S_{Em,Y_k}, n = 1, 2, \ldots, N \text{ and } k = 1, 2, \ldots, K,$$

and in step 89, solving the equation system for the respective signals $S_{Em,Y_k}$, m=1, ..., M and k=1, ..., K.

In such a manner the detection and processing result in a spectrally and spatially resolved signal. The signal may be displayed on a two-dimensional display with distance on one axis and energy on the other axis.

The detector system shown in FIG. 1 may be scanned across the object 7 to render a two-dimensional image. Every single pixel in such an image then contains spectral information of the radiation. Similarly, each pixel in this image contains spectral absorption information about the portion of the object that is obscuring the respective pixel. The image may be displayed on a two-dimensional display, wherein e.g. the average energy, or the average absorbed energy, may be shown by different color or gray scales.

Next, a fourth embodiment of the inventive method will be depicted. This method starts from the absorption spectrum for spectrally resolved absorption of X-ray radiation by an object as being calculated in step 79 of FIG. 9, i.e.

$$S_{Em}(abs) = S_{Em}(ref) - S_{Em}(obj), \text{ for } m=1, 2, \ldots, M.$$

$S_{Em}(ref)$ may have been measured by the inventive detector or may have been provided in other manner, e.g. as measured by other device or provided from literature data.

Then, it is assumed that the object consists of a number L of different known material or elements, $M_1, M_2, \ldots, M_L$. Each of these material or elements $M_1$ has a photon energy dependent absorption coefficient or absorption (per unit length) $A_l = A_l(E)$, l=1, 2, ..., L. Transforming this to the discrete values of E, i.e. $E_1, E_2, \ldots, E_M$, one has $A_l = A_{l1}, A_{l2}, \ldots A_{lM}$, l=1, 2, ..., L.

Assuming that these absorption values are provided, e.g. known or measured in any known manner, it is possible to form an equation system $$S_{Em}(abs) = \sum_{l=1}^{L} c_l A_{ml}, m = 1, 2, \ldots, M,$$

where $C_l$ is the amount, i.e. thickness or length, of material or element l in the object that the radiation beam has passed.

By solving the equation system for the $c_l$:s it is possible to measure the concentrations of different material or elements within the object to be measured.

It shall be appreciated that this fourth embodiment of the inventive method may be combined with the third embodiment of the inventive method in order to yield a multipoint measurement technique for the determining of contents of various material or elements in the object.

The method may find application e.g. within the radiological field for determining contents of bone, tissue, fat etc. in a human body and within the food industry for estimating contents of e.g. meat and fat in sausage products, etc.

Further, this method can also be used to measure the concentration of contrast media e.g. in different parts of the body.

It will be obvious that the invention may be varied in a plurality of ways. Such variations are not to be regarded as a departure from the scope of the invention. All such modifications as would be obvious to one skilled in the art are intended to be included within the scope of the appended claims.

What is claimed is:

1. A method for spectrally resolved detection of ionizing radiation in a detector comprising a chamber filled with an ionizable substance, and including a first and a second electrode arrangement, a radiation entrance, an electron avalanche amplification means, and a read-out arrangement, said method comprising:

introducing a radiation beam into the chamber between and substantially in parallel with the first and second electrode arrangements, for ionization of the ionizable substance, said radiation beam comprising a broadband spectrum of radiation; and avalanche amplification of electrons created during ionization;

by means of the read-out arrangement separately detecting electron avalanches, and/or correspondingly produced ions, $S_{X1}, S_{X2}, \ldots S_{XN}$, derivable mainly from ionization in sections, $X_1, X_2, \ldots, X_N$, of the chamber that are separated in the direction of the introduced radiation beam;

providing spectrally resolved absorption data for absorption of said broadband radiation in said ionizable substance;

from the absorption data deducing weighting factors, $W_{11}, W_{21}, \ldots, W_{M1}, W_{12}, W_{22}, \ldots, W_{M2}, \ldots, W_{1N}, W_{2N}, \ldots, W_{MN}$, for different spectral components, $E_1, E_2, \ldots, E_M$, of said broadband radiation and for different of said separated sections, $X_1, X_2, \ldots, X_N$, of the chamber; and by means of said detected electron avalanches and/or correspondingly produced ions, $S_{X1, SX2}, \ldots S_{XN}$, derivable mainly from ionization in different sections of the chamber, and said weighting factors deducing the respective detected electron avalanches, and/or correspondingly produced ions, $S_{E1}, S_{E2}, \ldots S_{EM}$, that are derivable from ionization by the respective spectral component of said broadband radiation.

2. The method as claimed in claim 1, wherein each of said weighting factors being substantially proportional to the photon flux, $\phi_{11}, \phi_{21}, \ldots, \phi_{M1}, \phi_{12}, \phi_{22}, \ldots, \phi_{M2}, \ldots, \phi_{1N}, \phi_{2N}, \ldots, \phi_{MN}$, of the respective spectral component, $E_1, E_2, \ldots, E_M$, in the respective section, $X_1, X_2, \ldots, X_N$.

3. The method as claimed in claim 1, wherein the respective detected electron avalanches, and/or correspondingly produced ions, $S_{E1}, S_{E2}, \ldots X_{EM}$, that are derivable from ionization by the respective spectral component of said broadband radiation are deduced by solving the equation system $$S_{X_n} = \sum_{m=1}^{M} w_{mn} S_{Em}, n = 1, 2, \ldots, N.$$

4. The method as claimed in claim 1, wherein the number M of spectral components of said broadband radiation is equal to the number N of sections of the chamber.

5. The method as claimed in claim 1, wherein the number M of spectral components of said broadband radiation is less than the number N of sections of the chamber.

6. The method as claimed in claim 1, wherein the number M of spectral components of said broadband radiation is at least two.

7. The method as claimed in claim 1, wherein the number M of spectral components of said broadband radiation is at least three.

8. The method of claimed in claim 1, wherein the number M of spectral components of said broadband radiation is at least five.

9. The method as claimed in claim 1, wherein the number M of spectral components of said broadband radiation is at least seven.

10. The method as claimed in claim 1, wherein the number M of spectral components of said broadband radiation is chosen in dependence on the spectrum of the broadband radiation such that spectral details, particularly narrow resonance peaks or double peaks, of the spectrum are resolved.

11. The method as claimed in claim 1, wherein the ionizable substance is a gas, a liquid, or a solid.

12. The method as claimed in claim 11, wherein the ionizable substance comprises an inert gas, preferably krypton or xenon.

13. The method as claimed in claim 1, wherein the electrons are avalanche amplified in a gas, in a liquid, or in a solid material.

14. The method as claimed in claim 13, wherein the electrons are avalanche amplified in a substance comprising an inert gas, preferably krypton or xenon.

15. The method as claimed in claim 1, wherein the lengths of the sections, $X_1, X_2, \ldots, X_N$, of the chamber are different.

16. The method as claimed in claim 1, wherein the spectral widths of the spectral components, $E_1, E_2, \ldots, E_m$, of the broadband radiation are different.

17. The method as claimed in claim 1, wherein electron avalanches, and/or correspondingly produced ions, $S_{X1}, S_{X2}, \ldots S_{XN}$, derivable mainly from ionization in separated sections, $X_1, X_2, \ldots, X_N$, of the chamber, are separately detected through counting of pulses induced by said electron avalanches, and/or correspondingly produced ions.

18. The method as claimed in claim 1, wherein electron avalanches, and/or correspondingly produced ions, $S_{X1}, S_{X2}, \ldots S_{XN}$, derivable mainly from ionization in separated sections, $X_1, X_2, \ldots, X_N$, of the chamber, are separately detected through integration of pulses induced by said electron avalanches, and/or correspondingly produced ions.

19. The method as claimed in claims 18, wherein the integration of pulses comprises the summation of pulse amplitude values.

20. The method as claimed in claim 1, wherein the deduced respective detected electron avalanches, and/or correspondingly produced ions, $S_{E1}, S_{E2}, \ldots S_{EM}$, as derivable from ionization by the respective spectral component of said broadband radiation, are further calibrated by using a known reference spectrum.

21. The method as claimed in claim 1, further comprising introducing the radiation beam in the form of a planar radiation beam into the chamber, and by means of the the read-out arrangement separately detecting electron avalanches, and/or correspondingly produced ions, $S_{Y1}, S_{Y2}, \ldots, S_{YK}$, derivable mainly from ionization by transversely separated portions, $Y_1, Y_2, \ldots, Y_K$ of said planar radiation beam.

22. The method as claimed in claim 21, wherein said method, for each transversely separated portion, $Y_1, Y_2, \ldots, Y_K$, of said planar radiation beam, comprises the steps of:
by means of the read-out arrangement separately detecting electron avalanches, and/or correspondingly produced ions, $S_{Xn,Yk}$, n=1, 2, . . . , N and k=1, 2, . . . , K, derivable mainly from ionization in sections, $X_1, X_2, \ldots, X_N$, that are separated in the direction of the introduced radiation beam; and
by means of said detected electron avalanches and/or correspondingly produced ions, $S_{Xn,Yk}$, n=1, 2, . . . , N and k=1, 2, . . . , K, derivable mainly from different sections of the chamber, and said weighting factors deducing the respective detected electron avalanches, and/or correspondingly produced ions, $S_{Em,Yk}$, m=1, 2, . . . , M and k=1, 2, . . . , K, that are derivable from ionization by the respective spectral component of said broadband radiation.

23. The method as claimed in claim 1, wherein radiation beam, prior to being introduced into the chamber, is transmitted through or reflected off an object.

24. The method as claimed in claim 23, wherein
the value of each respective spectral component of said broadband radiation is provided; and
the deduced respective detected electron avalanches, and/or correspondingly produced ions, $S_{E1}, S_{E2}, \ldots, S_{EM}$, that are derivable from ionization by the respective spectral component of said broadband radiation are subtracted from said provided value of each respective spectral component, thus yielding an absorption spectrum for spectrally resolved absorption of X-ray radiation by said object.

25. The method as claimed in claim 1, being repeated twice;
once in which the radiation beam, prior to being introduced into the chamber, is transmitted through or reflected off an object to be measured; and
once in which the radiation beam is introduced into the chamber without being transmitted through or reflected off said object; and further comprising
subtracting the deduced respective electron avalanches, and/or correspondingly produced ions, that are derivable from ionization by the respective spectral component of said broadband radiation with prior transmission through or reflection off said object, from the deduced respective electron avalanches, and/or correspondingly produced ions, that are derivable from ionization by the respective spectral component of said broadband radiation without prior transmission through or reflection off said object, thus yielding an absorption spectrum for spectrally resolved absorption of X-ray radiation by said object.

26. The method as claimed in claim 24, wherein the radiation beam interacts with said object by means of being transmitted through said object, said method further comprising the steps of:
identifying a number, L, of different elements, $M_1, M_2, \ldots, M_L$, being comprised in said object; and
for each of said elements, $M_l$, l=1, . . . , L, providing photon energy dependent absorption-per-length-unit values, $A_{ml}$, m=1, 2, . . . , M;
by means of said yielded absorption spectrum for spectrally resolved absorption of X-ray radiation by said object and said provided photon energy dependent absorption-per-length-unit values, $A_{ml}$, m=1, 2, . . . , M, deducing the amount, $c_l$, l=1, 2, . . . , L, of each of said elements through which said radiation beam is transmitted.

27. The method as claimed in claim 26, wherein the amount, $c_l$, l=1, 2, . . . , L, of each said elements through which said radiation beam is transmitted is deduced by solving the equation system $$S_{Em}(\text{abs}) = \sum_{l=1}^{L} c_l A_{ml}, m = 1, 2, \ldots, M,$$

where $S_{Em}(\text{abs})$, m=1, 2, . . . , M, is said yielded absorption spectrum for spectrally resolved absorption of X-ray radiation by said object.

28. A device for spectrally resolved detection of ionizing radiation comprising a chamber filled with an ionizable substance, and including a first and a second electrode arrangement, a radiation entrance, an electron avalanche amplification means, a read-out arrangement, and a processing means wherein:

a radiation beam is insertable into the chamber between and substantially in parallel with the first and second electrode arrangements, for ionization of the ionizable substance, said radiation beam comprising a broadband spectrum of radiation; and the avalanche amplification means is arranged for avalanche amplifying electrons created during ionization;

the read-out arrangement is arranged for separately detecting electron avalanches, and/or correspondingly produced ions, $S_{X1}, S_{X2}, \ldots S_{XN}$, derivable mainly from ionization in sections, $X_1, X_2, \ldots, X_N$, of the chamber that are separated in the direction of the introduced radiation beam; and the processing means is arranged for
(i) holding spectrally resolved absorption data for absorption of said broadband radiation in said ionizable substance;
(ii) from the absorption data deducing weighting factors, $W_{11}, W_{21}, \ldots, W_{M1}, W_{12}, W_{22}, \ldots, W_{M2}, \ldots, W_{1N}, W_{2N}, \ldots, W_{MN}$, for different spectral components, $E_1, E_2, \ldots, E_M$, of said broadband radiation and for different of said separated sections, $X_1, X_2, \ldots, X_N$, of the chamber; and
(iii) by means of said detected electron avalanches and/or correspondingly produced ions, $S_{X1}, S_{X2}, \ldots S_{XN}$, derivable mainly from ionization in different sections of the chamber, and said weighting factors deducing the respective detected electron avalanches, and/or correspondingly produced ions, $S_{E1}, S_{E2}, \ldots S_{EM}$, that are derivable from ionization by the respective spectral component of said broadband radiation.

29. The device as claimed in claim 28, wherein each of said weighting factors is substantially proportionally to the photon flux, $\phi_{11}, \phi_{21}, \ldots, \phi_{M1}, \phi_{12}, \phi_{22}, \ldots, \phi_{M2}, \ldots, \phi_{1N}, \phi_{2N}, \ldots, \phi_{MN}$, of the respective spectral component, $E_1, E_2, \ldots, E_M$, in the respective section, $X_1, X_2, \ldots, X_N$.

30. The device as claimed in claim 28, wherein the processing means is arranged for deducing the respective detected electron avalanches, and/or correspondingly produced ions, $S_{E1}, S_{E2}, \ldots S_{EM}$, that are derivable from ionization by the respective spectral component of said broadband radiating by solving the equation $$S_{Xn} = \sum_{m=1}^{M} w_{mn} S_{Em}, n = 1, 2, \ldots, N.$$

31. The device as claimed in claim 28, wherein the number M of spectral components of said broadband radiating is equal to the number N of sections of the chamber.

32. The device as claimed in claim 28, wherein the number M of spectral components of said broadband radiation is less than the number N of sections of the chamber.

33. The device as claimed in claim 28, wherein the ionizable substance is a gas, a liquid, or a solid.

34. The device as claimed in claim 33, wherein the ionizable substance comprises an inert gas, preferably krypton or zenon.

35. The device as claimed in claim 28, wherein electrons are avalanche amplified in a gas, in a liquid, or in a solid material.

36. The device as claimed in claim 35, wherein the electrons are avalanche amplified in a substance comprising an inert gas, preferably krypton or xenon.

37. The device as claimed in claim 28, wherein the lengths of the sections, $X_1, X_2, \ldots, X_N$ of the chamber are different.

38. The device as claimed in claim 28, wherein the spectral widths of the spectral components, $E_1, E_2, \ldots, E_M$ of the broadband radiation are different.

39. The device as claimed in claim 28, wherein it is arranged for separately detecting electron avalanches, and/or correspondingly produced ions, $S_{X1}, S_{X2}, \ldots S_{XN}$, derivable mainly from ionization in separated sections, $X_1, X_2, \ldots, X_N$ of the chamber, through counting of pulses induced by said electron avalanches, and/or correspondingly produced ions.

40. The device as claimed in claim 28, wherein it is arranged for separately detecting electron avalanches, and/or correspondingly produced ions, $S_{X1}, S_{X2}, \ldots S_{XN}$, derivable mainly from ionization in separated sections, $X_1, X_2, \ldots, X_N$, of the chamber, through integration of pulses induced by said electron avalanches, and/or correspondingly produced ions.

41. The device as claimed in claim 40, wherein it is arranged for integration of pulses by means of summation of pulse amplitude values.

42. The device as claimed in claim 28, wherein a radiation beam in the form of a planar radiation beam is insertable into the chamber, and the read-out arrangement is arranged for separate detection of electron avalanches, and/or correspondingly produced ions, $S_{Y1}, S_{Y2}, \ldots, S_{YK}$, derivable mainly from ionization by transversely separated portions, $Y_1, Y_2, \ldots, Y_k$, of said planar radiation beam.

43. The device as claimed in claim 42, wherein said read-out arrangement is, for each transversely separated portion, $Y_1, Y_2, \ldots, Y_k$, of said planar radiation beam, arranged for detection of electron avalanches, and/or correspondingly produced ions, $S_{Xn,Yk}$, n=1, 2, . . . , N and k=32 1, 2, . . . , K, derivable mainly from ionization in sections, $X_1, X_2, \ldots, X_N$, that are separated in the direction of the introduced radiation beam; and wherein said processing means is, for each transversely separated portion, $Y_1, Y_2, \ldots, Y_k$, of said planar radiation beam, arranged for, by means of said detected electron avalanches and/or correspondingly produced ions, $S_{Xn,Yk}$, n=1, 2, . . . , N and k=1, 2, . . . , K, derivable mainly from different sections of the chamber, and said weighting factor, deducing the respective detected electron avalanches, and/or correspondingly produced ions, $S_{Em,Yk}$, m=1, 2, . . . , M and k=1, 2, . . ., K, that are derivable from ionization by the respective spectral component of said broadband radiation.

44. The device as claimed in claim 28, wherein the radiation beam, prior to being introduced into the chamber, is arranged to be transmitted through or reflected off an object.

45. The device as claimed in claim 44, wherein the processing means is arranged for holding the value of each respective spectral component of said broadband radiation is provided; and for subtracting the deduced respective detected electron avalanches, and/or correspondingly produced ions, $S_{E1}, S_{E2}, \ldots, S_{EM}$, that are derivable from ionization by the respective spectral component of said broadband radiation from said provided value of each respective spectral component, thus yielding an absorption spectrum for spectrally resolved absorption of X-ray radiation by said object.

46. The device as claimed in claim 28, being arranged for two detections;
- one in which the radiation beam, prior to being introduced into the chamber, is transmitted through or reflected off an object to be measured; and
- one in which the radiation beam is introduced into the chamber without being transmitted through or reflected off said object; and wherein
- said processing means is arranged for subtracting the deduced respective electron avalanches, and/or correspondingly produced ions, that are derivable from ionization by the respective spectral component of said broadband radiation with prior transmission through or reflection off said object, from the deduced respective electron avalanches, and/or correspondingly produced ions, that are derivable from ionization by the respective spectral component of said broadband radiation without prior transmission through or reflection off said object, thus yielding an absorption spectrum for spectrally resolved absorption of X-ray radiation by said object.

47. The device as claimed in claim 45, wherein the radiation beam is arranged to interact with said object by means of being transmitted through said object, said processing means being further arranged for:
- holding identifications of a number L of different elements, $M_1, M_2, \ldots, M_L$, being comprised in said object;
- for each of said elements, $M_l$, l=1, ..., L, holding photon energy dependent absorption-per-length-unit values, $A_{ml}$, m=1, 2, ..., M; and
- by means of said yielded absorption spectrum for spectrally resolved absorption of X-ray radiation by said object and said provided photon energy dependent absorption per length unit values, $A_{ml}$, m=1, 2, ..., M, deducing the amount, $c_l$, l=1, 2, ..., L, of each of said elements through which said radiating beam is transmitted.

* * * * *